United States Patent [19]
Chen

[11] Patent Number: 5,641,530
[45] Date of Patent: Jun. 24, 1997

[54] METHOD OF DISINFECTION

[75] Inventor: T. C. Chen, Starkville, Miss.

[73] Assignee: Eka Nobel Inc., Marietta, Ga.

[21] Appl. No.: 565,303

[22] Filed: Nov. 27, 1995

[51] Int. Cl.$^6$ ........................................ A23L 3/34
[52] U.S. Cl. .................. 426/532; 426/321; 426/331; 426/335; 426/652
[58] Field of Search ........................ 426/335, 532, 426/321, 322, 323, 331, 332, 531, 574, 652

[56] References Cited

U.S. PATENT DOCUMENTS 3,792,177  2/1974  Nakatani et al. ................. 426/335
3,996,386  12/1976  Malkki et al. ..................... 426/335
5,264,229  11/1993  Mannig et al. .................... 426/335

OTHER PUBLICATIONS

Kelly et al., WPIDS, Derwent Abstract 91-208033, ZA 89-9597, Dec. 1989.
WPIDS, Derwent Abstract 79-86671B, JP54135036 Sep. 1993.

Primary Examiner—Leslie Wong
Attorney, Agent, or Firm—Burns, Doane, Swecker & Mathis

[57] ABSTRACT

A method of disinfection of foodstuff involving the use of hydrogen peroxide in combination with anti-microbial agents selected from the group consisting of benzoic acid, and phosphoric acid, at low concentration, to substantially reduce the microbial count in food-related application.

6 Claims, No Drawings

METHOD OF DISINFECTION

FIELD OF THE INVENTION

The present invention relates to a method of disinfection in food processing involving the use of hydrogen peroxide in combination with anti-microbial agents selected from the group consisting of benzoic acid and phosphoric acid to reduce the microbial count in food-related applications.

BACKGROUND OF THE INVENTION

Disinfection is a worldwide problem within the foodstuff industry and numerous efforts have been made with additives to attempt to reduce the microbial load on fresh muscle foods. Some of the techniques used have been by chilling or dipping the products with antimicrobial compounds. However, the use of antimicrobial compounds has been limited due to its efficacy as well as cost.

U.S. Pat. No. 3,792,177 to Nakatani et al. relates to a method for improving the quality of foodstuff by the addition to the foodstuff of a mixture of a water soluble metal phosphate-hydrogen peroxide adduct and a water soluble acid metal phosphate, the ratio of said adduct to said metal phosphate being about 1 part by weight to from about 0.5 to about 9 parts by weight.

U.S. Pat. No. 4,915,955 to J. Gömöri relates to a process for preparing a storage stable concentrate comprising admixing (i) an inorganic acid such as 75% phosphoric acid, 65% aqueous nitric acid or 69% aqueous sulphuric acid in water with (ii) a silver composition selected from silver salts and silver salt complexes and (iii) an organic acid stabilizer selected from e.g. tartaric acid and/or citric acid.

EP B1 87 049 relates to a disinfectant for hospitals, schools, breweries, laundries, etc. comprising a composition comprising 1–15 % $H_2O_2$, 1–30% phosphorous compound, 0.1–5% metal chelating agent, 0–20% surfactant and the rest water.

CA 1 146 851 relates to a composition for disinfection of dental and medical equipment by the use of a composition comprising $H_2O_2$, Tetronic 908 and $H_3PO_4$, benzotriazole, Acitrol and deionized water.

U.S. Pat. No. 5,264,229 relates to a commercial process for extending the shelf life of poultry and seafood by introducing food grade $H_2O_2$ and foodgrade surface active agents into the chiller water to wash off bacteria on the surface of the food product. The agents are alkylaryl sulfonates, sulfates, sulfonates of oils and fatty acid, sulfate of alcohols and sulfosuccinates.

Chen et al. reported 1973 that immersion of fresh poultry meat into ice water containing polyphosphates extends the shelf life of the meat and that the immersion of fresh chicken parts in a 3% polyphosphate solution controll gram-positive *microccoci* and Staphyloccoci, but that certain gram-negative organisms tolerated the addition of 1–6% phosphate. Foster and Mead reported 1976 that Salmonella growth in minced chicken breast meat was inhibited by using 0.35% polyphosphate solution followed by storage at –2° and –20° C.

The term "shelf-life" usually refers to the period of quality deterioration by decreasing nutritional value, color changes, development of off-flavors, and/or textural changes occurring during storage. Microbial spoilage that results in physical and chemical changes is one of the principal factors responsible for the relatively short shelf-life of muscle foods.

Said prior art, however, say nothing about the findings which constitute the basis for the present invention, namely that a combination of hydrogen peroxide and an antimicrobial agent selected from benzoic acid and phosphoric acid, and combinations thereof, at low concentration effectively reduces the microbial count on foodstuff, especially fresh muscle foods.

DESCRIPTION OF THE INVENTION

The present inventor has surprisingly found a synergistic antimicrobial effect, when hydrogen peroxide is used in combination with antimicrobial compounds selected from the group consisting of benzoic acid and phosphoric acid and combinations thereof.

Said findings permit the use of low concentrations of hydrogen peroxide and the selected antimicrobial compounds allows the application dosage, due to the strong germicidal synergistic effect as obtained, to be cut down drastically.

The concequences of the reduced dosages are e.g. a better effect, a better acceptance of hydrogen peroxide as sanitizing agent as well as decreased costs for preservation.

The antimicrobial combination according to the invention can be applied to the foodstuff by spraying, dipping, painting or in any other way known to the man skilled in the art.

The antimicrobial composition is a mixture obtained by mixing the compounds as included.

The temperature as used during the application process is preferably from +25° F. (–4° C.) to +90° F. (+32° C.), most preferably ice water temperature.

The concentration of hydrogen peroxide in the composition is preferably between 0.001 to 0.1%, most preferably between 0.005 to 0.035%, and the concentration of the other anti-bacterial agent is preferably between 0.001 to 0.5%, most preferably between 0.005 to 0.1% .

Phosphoric acid is the only inorganic acid that is widely used as a food acidulant and a comparatively cheap all food grade acidulant. It is also a strong acid giving a low pH. Phosphoric acid and its salts are categorized as GRAS (generally recognized as safe) compounds by the FDA. It has been indicated that enzymatic activity can be obstructed at pH values under 3.0 with the addition of acid. Phosphoric acid used in food manufacturing such as carbonated and non-carbonated drinks, can lower the pH values to 2.5–3.3. Phosphoric acid besides being used in soft drinks is also used in cheeses and brewing products to adjust the pH.

Benzoic acid is an aromatic carboxylic acid with the formula $C_6H_5COOH$. Benzoic acid is known as a preservative of foods.

By the present invention it has, however, surprisingly been shown experimentally that the combination of hydrogen peroxide and phosphoric acid or benzoic acid gives superior disinfection of food compared to combinations of hydrogen peroxide with phosphate or pyrophosphate.

When applied to chicken parts or poultry meat, a hydrogen peroxide and phosphoric acid combination as well as a hydrogen peroxide and benzoic acid combination demonstrated a more superior antimicrobial effects than combinations comprising hydrogen peroxide in combination with L-ascorbic acid, sodium pyrophosphate, sodium tripolyphosphate, or trisodiumphosphate as shown in Table 2.

The synergistic antimicrobial effect of hydrogen peroxide and benzoic acid (Fisher Scientific Company, A-65), as well as hydrogen peroxide and phosphoric acid (85%, Fisher Scientific Company, A-242) on poultry chilling water microorganisms were tested. The poultry meat microbial suspensions containing approximately $10^4$ CFU were prepared by mixing 1 ml of the poultry wash water with a form of nutrient agar to allow bacteria colonies to form on the plates for later "colony forming unit" (CFU) counts. In addition, a factor of ten (10) serial dilutions was also made for each test in the event that bacterial formation might be "too numerous to count" (TNTC). Lower log numbers of bacteria found by the plate counting method generally indicate a greater degree of food disinfection, and a higher potential for increased shelf life due to the reduction of slime-forming microorganisms. Although their is no current industry standard as to an acceptable log number of bacteria found on food for human consumption, such results are useful in the analysis of food disinfection data for comparison purposes.

The bacterial reduction effect of hydrogen peroxide, and the two other anti-microbial agents were studies, both individually and in combination. The antimicrobial agents used in this study were selected due to their status as accepted GRAS compounds from the Food Additives Handbook published by CRC.

Hydrogen peroxide (35%) and the selected additives were used individually or in combinations. Microbial suspensions (50 ml) were randomly assigned to one of the following treatments: (1) non-treated controls; (2) hydrogen peroxide at 0.035%; (3) hydrogen peroxide combined with selected additives. The length of the treatment time was 30 min.

The final concentration of the benzoic acid in the microflora suspensions was 0.1% and the concentration of the phosphoric acid was 0.085%.

Total plate counts were conducted immediately after each treatment. Serial dilutions of the mixture were plated and incubated at 30° C. for 48 hrs.

The results of the tests are presented in the attached data tables.

Our research data indicated that there is a synergistic effect between low concentrations of hydrogen peroxide and the antimicrobial compounds as used according to the invention. This strong germicidal synergistic effect on food microorganisms could drastically cut the antimicrobial compound application dosage, as well as the cost of preservation.

The germicidic effect of hydrogen peroxide has been well recognized. Our data has indicated that the germicidic effect of hydrogen peroxide can be improved by the synergistic effect with the antimicrobial compounds according to the invention. Therefore, the acceptance of hydrogen peroxide as a sanitizing agent by consumers could be enhanced.

The synergistic effect of hydrogen peroxide and phosphoric acid on Shelf-life of chicken breast fillet and leg quarters Commercial type broiler carcasses cut into quarters were obtained from the Mississippi State University poultry processing plant. The cut-up parts were randomly assigned to one of two treatments as follows: (1) ice water and broiler parts only (4:1 ratio) as a control group, (2) 0.17% phosphoric acid and 0.07% hydrogen peroxide added to broiler parts (4:1 ratio).

Each treatment consisted of two replications. Each replication contained 5 leg quarters and 5 breast fillets. The amount of solution used was calculated on a weight basis as four times that of the chicken parts. Samples were kept submerged in the well mixed solutions for 30 min. Treated samples were packed in plastic poultry bags and placed in a 40° F. refrigerator. Total plate counts were conducted at day 0 and repeated every day through 20 days of storage.

Measurement and Analysis - Total Plate Counts (TPC)

A. For poultry carcasses

Equal quantities, by weight, of sterile 0.1% peptone solution and poultry carcasses were placed in a sterile plastic bag and shaken vigorously for 1 min. Using a "pour-plate" method (APHA, 1976), serial dilutions of the samples were plated onto standard plate count agar (Difco) and incubated at 30° C. for 48 hr. The colony numbers were averaged from duplicate plates and reported as log CFU/g sample.

The results of the tests are presented in the attached data tables.

TABLE 1

Synergistic Effects of Hydrogen Peroxide and the Antimicrobial Compounds according to the invention on TPC of Poultry Meat Wash Water[1]

| Treatment | TPC (log CFU/ml)[3,4,5] | | | | | |
|---|---|---|---|---|---|---|
| | R1 | R2 | R3 | R4 | R5 | Overall Mean |
| Control | 4.59 | 3.78 | 3.85 | 4.22 | 4.62 | 4.21 B |
| $H_2O_2$ | 3.30 | 2.80 | 2.82 | 2.77 | 2.98 | 2.93 A |
| $H_2O_2$ | 3.30 | 2.80 | 2.82 | 2.77 | 2.98 | 2.93 B |
| Benzoic acid | 1.70 | 2.34 | 2.65 | 1.97 | 3.61 | 2.45 B |
| Benzoic acid + $H_2O_2$ | ND | −0.30 | ND | ND | 0.18 | −0.02 A |
| $H_2O_2$ | 3.30 | 2.80 | 2.82 | 2.77 | 2.98 | 2.93 C |
| Phosphoric acid | 2.24 | 2.08 | 1.79 | 1.51 | 2.33 | 1.99 B |
| Phosphoric acid + $H_2O_2$ | ND | ND | 0.30 | ND | 0.18 | 0.10 A |

[1]The chicken wash water has been kept in a refrigerator for more than 30 days.
[3]Each mean represents the mean of 2 observations.
[4]A–C, means in the same column not followed by the same letter are significantly different ($P < .05$)
[5]ND = non-detectable

TABLE 2

COMPARATIVE TESTS
Effects of Hydrogen Peroxide and Commonly Used Antimicrobial Compounds on TPC of Poultry Meat Wash Water[1]

| Treatment | TPC (log CFU/ml)[3,4,5] | | | | | |
|---|---|---|---|---|---|---|
|  | R1 | R2 | R3 | R4 | R5 | Overall Mean |
| Control | 4.59 | 3.78 | 3.85 | 4.22 | 4.62 | 4.21 B |
| $H_2O_2$ | 3.30 | 2.80 | 2.82 | 2.77 | 2.98 | 2.93 A |
| $H_2O_2$ | 3.30 | 2.80 | 2.82 | 2.77 | 2.98 | 2.93 B |
| L-ascorbic acid | 3.49 | 3.37 | 3.84 | 3.62 | 4.58 | 3.78 B |
| L-ascorbic acid + $H_2O_2$ | 1.89 | 0.48 | 1.02 | −0.30 | 3.76 | 1.37 B |
| $H_2O_2$ | 3.30 | 2.80 | 2.82 | 2.77 | 2.98 | 2.93 B |
| Sodium pyrophosphate | 3.43 | 3.14 | 3.67 | ND | 4.55 | 2.96 B |
| Sodium pyrophosphate + $H_2O_2$ | 0.65 / $2.10^2$ | −0.30 / $1.60^2$ | 0.60 / $2.27^2$ | 0.30 / $2.00^2$ | 1.86 / $3.37^2$ | 0.62 A / 2.27 B |
| $H_2O_2$ | 3.30 | 2.80 | 2.82 | 2.77 | 2.98 | 2.93 BC |
| Sodium tripolyphosphate | 3.61 | 3.33 | 3.76 | 3.25 | 4.63 | 3.72 C |
| Sodium tripolyphosphate + $H_2O_2$ | ND / $ND^2$ | 0.18 / $2.11^2$ | 0.40 / $2.53^2$ | 0.48 / $2.35^2$ | 2.26 / $3.86^2$ | 0.72 A / 2.17 B |
| $H_2O_2$ | 3.30 | 2.80 | 2.82 | 2.77 | 2.98 | 2.93 B |
| Trisodiumphosphate | 2.86 | 2.83 | 3.35 | 2.71 | 4.23 | 3.20 B |
| Trisodiumphosphate + $H_2O_2$ | 1.86 | 0.65 | 0.54 | −0.30 | 1.41 | 0.83 A |

[1]The chicken wash water has been kept in a refrigerator for more than 30 days.
[2]When diluted to lower concentration (1:10), sodium pyrophosphate + $H_2O_2$ and sodium tripolyphosphate have higher number of bacteria.
[3]Each mean represents the mean of 2 observations.
[4]A–C, means in the same column not followed by the same letter are significantly different ($P < .05$).
[5]ND = non-detectable

I claim:

1. A method of disinfection of foodstuff comprising treating a foodstuff with a microbial count reducing amount of a composition comprising hydrogen peroxide in combination with an anti-microbial agent selected from the group consisting of benzoic acid, and phosphoric acid, wherein the concentration of hydrogen peroxide in the composition is from 0.005 to 0.035%, and the concentration of the other anti-microbial agent is from 0.005 to 0.1%.

2. A method as claimed in claim 1 comprising the use of a composition consisting essentially of hydrogen peroxide and phosphoric acid.

3. A method as claimed in claim 1 comprising the use of a composition consisting essentially of hydrogen peroxide and benzoic acid.

4. A method as claimed in claim 1 wherein the foodstuff treated is a fresh muscle food of poultry, fish, or other seafood products.

5. A method as claimed in claim 1 wherein the concentration of hydrogen peroxide is 0.035%.

6. A method as claimed in claim 1 wherein the concentration of the other anti-microbial agent(s) is 0.1%.

* * * * *